(12) United States Patent
Chuang et al.

(10) Patent No.: US 7,109,611 B2
(45) Date of Patent: Sep. 19, 2006

(54) SILICON-STEEL STRUCTURE FOR MOTOR

(75) Inventors: Yu-Wei Chuang, Taoyuan Hsien (TW); Po-Jen Shih, Taoyuan Hsien (TW); Tai-Ying Lu, Taoyuan Hsien (TW)

(73) Assignee: Ideal Elethermal Inc., Taoyuan Hsien (TW)

( * ) Notice: Subject to any disclaimer, the term of this patent is extended or adjusted under 35 U.S.C. 154(b) by 0 days.

(21) Appl. No.: 09/987,513

(22) Filed: Nov. 15, 2001

(65) Prior Publication Data

US 2002/0096961 A1 Jul. 25, 2002

(30) Foreign Application Priority Data

Jan. 19, 2001 (TW) .............................. 90201180 U

(51) Int. Cl.
*H02K 1/12* (2006.01)
(52) U.S. Cl. .................... 310/49 R; 310/149; 310/254; 310/164; 310/42; 310/216; 310/218
(58) Field of Classification Search .............. 310/67 R, 310/164, 257, 49, 194, 49 R, 149, 254, 42, 310/216, 218
See application file for complete search history.

(56) References Cited

U.S. PATENT DOCUMENTS

| | | | | |
|---|---|---|---|---|
| 4,987,331 A * | 1/1991 | Horng | ........................ | 310/254 |
| 5,859,487 A * | 1/1999 | Chen | .......................... | 310/254 |
| 6,121,710 A * | 9/2000 | Ho | .............................. | 310/254 |
| 6,320,291 B1 * | 11/2001 | Lin et al. | ....................... | 310/91 |
| 6,337,526 B1 * | 1/2002 | Lin | .............................. | 310/90 |

* cited by examiner

*Primary Examiner*—Darren Schuberg
*Assistant Examiner*—Iraj A. Mohandesde
(74) *Attorney, Agent, or Firm*—Rosenberg, Klein & Lee

(57) ABSTRACT

A silicon-steel structure for motor comprises a silicon-steel plate made of magnetic material. The silicon-steel plate comprises a main body of rectangular shape when being expanded and a plurality of tooth portions on top and bottom sides of the main body. The tooth portions are integrally formed on top and bottom sides of the main body and have same pitch. Moreover, the tooth portions on top of the main body are complementary and staggered with the tooth portions on bottom of the main body. The tooth portions are bent vertically with respect to the main body and the main body is rolled to form a cylindrical shape to form a silicon-steel structure for motor.

1 Claim, 6 Drawing Sheets

SILICON-STEEL STRUCTURE FOR MOTOR

FIELD OF THE INVENTION

The present invention relates to a silicon-steel structure for motor, especially to a silicon-steel structure for motor, which has compact size, high winding occupancy and simple wiring process.

BACKGROUND OF THE INVENTION

As the operating speed of electronic devices such as CPU become higher, more heat is generated and dissipating fan is used to remove excessive heat. The motor for the dissipating fan has the requirement of high efficiency, low price and compact size.

The prior art DC brushless motor stator can be classified to two categories. As shown in FIG. 1, the first kind of motor stator is fabricated by stacking plurality layers of silicon-steel plates 10a made of magnetic materials. The silicon-steel plates 10a are surrounded by winding 11a to form a DC brushless motor stator. However, thus formed DC brushless motor stator has following drawbacks:
1. Hard to be compact.
2. Low winding efficiency.
3. The winding process is difficult.

FIG. 2 shows another kind of motor stator. The motor stator comprises an upper silicon-steel plate 21a and a lower silicon-steel plate 21a bridged by an iron sleeve 20a. A plurality of windings (not shown) are wound between the two silicon-steel plates 21a. However, thus formed DC brushless motor stator has following drawbacks:
1. It is hard for the iron sleeve 20a to assemble between the two silicon-steel plates 21a.
2. The parallel between the silicon-steel plates 21a is hard to maintain, the output of the motor is hard to optimize.
3. There is a gap between the iron sleeve 20a and the two silicon-steel plates 21a, the magnetic circuit is not closed and the rotation speed of the motor is degraded.

SUMMARY OF THE INVENTION

It is the object of the present invention to provide a silicon-steel structure for motor, which has compact size, high winding occupancy and simple wiring process.

In one aspect of the invention, whole silicon-steel plate is integrally formed. The silicon-steel plate has not conventional problem wherein the iron sleeve is hard to assemble between the two silicon-steel plates, and the parallel between the silicon-steel plates is hard to maintain. Therefore, the motor made by the silicon-steel structure of the present invention has high output power.

In another aspect of the invention, the silicon-steel structure of the present invention is integrally formed to overcome the problem of air gap between prior art iron ring and silicon steel plate. The DC brushless stator formed by the silicon-steel structure of the present invention has closed magnetic circuit to provide satisfactory motor speed.

To achieve above object, the silicon-steel structure for motor comprises a silicon-steel plate made of magnetic material. The silicon-steel plate comprises a main body of rectangular shape when being expanded and a plurality of tooth portions on top and bottom sides of the main body. The tooth portions are integrally formed on top and bottom sides of the main body and have same pitch. Moreover, the tooth portions on top of the main body are complementary and staggered with the tooth portions on bottom of the main body. The tooth portions are bent vertically with respect to the main body and the main body is rolled to form a cylindrical shape to form a silicon-steel structure for motor.

The various objects and advantages of the present invention will be more readily understood from the following detailed description when read in conjunction with the appended drawing, in which:

DETAILED DESCRIPTION OF THE INVENTION

Figure 1:
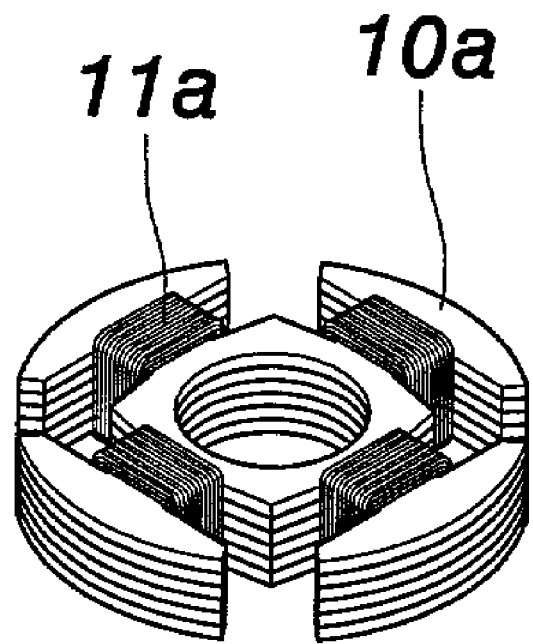
FIG. 1 shows the perspective view of prior art DC brushless motor stator.
Figure 2:
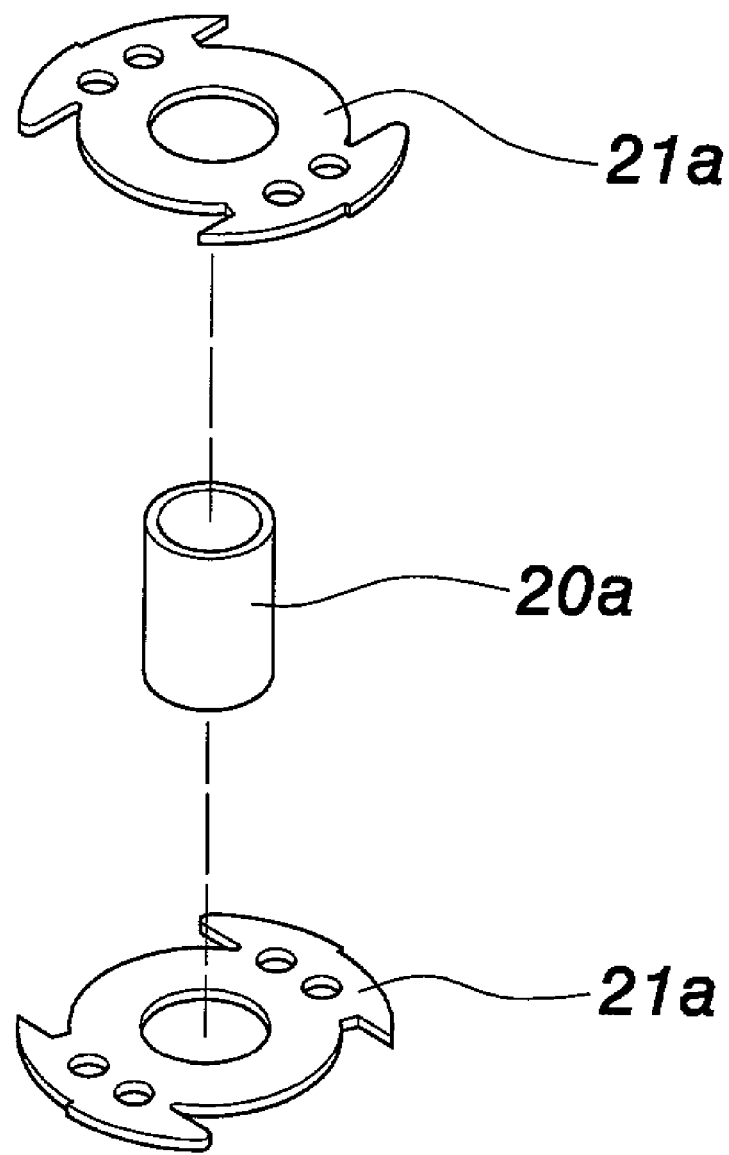
FIG. 2 shows the perspective view of another prior art DC brushless motor stator.
Figure 3:
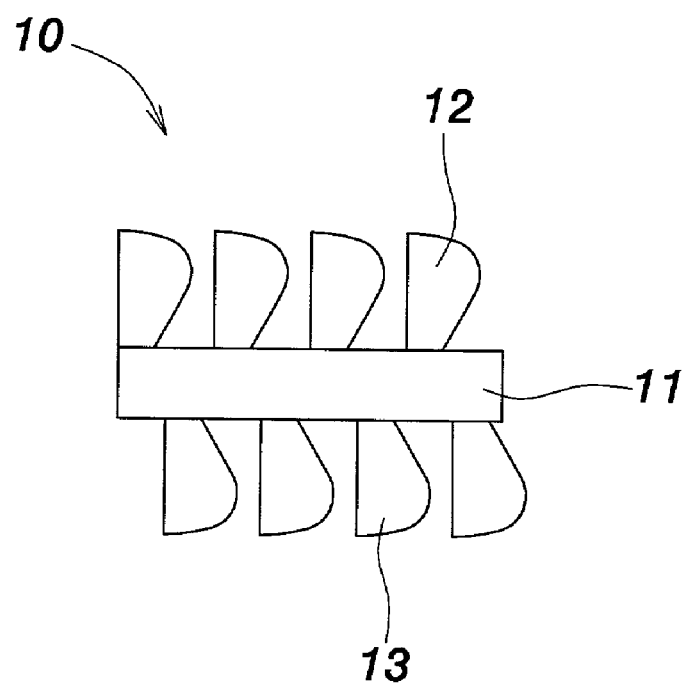
FIG. 3 shows the exploded view of the present inventions.
Figure 4:
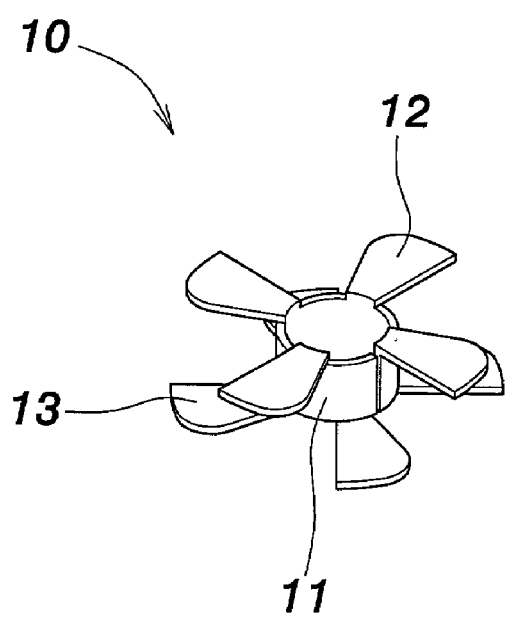
FIG. 4 shows the perspective view of the present inventions.

FIG. 3 and FIG. 4 show the exploded view and perspective view of the present inventions. The present invention provides a silicon-steel structure for motor. The silicon-steel structure mainly comprises a silicon-steel plate 10 made of magnetic materials and the size (length, width and thickness) of the silicon-steel plate 10 can be varied according to practical usage.

The silicon-steel plate 10 comprises a main body 11 of rectangular shape when being expanded and a plurality of tooth portions 12 and 13 on top and bottom sides of the main body 11. The tooth portions 12 and 13 are integrally formed on top and bottom sides of the main body 11 and have same pitch. Moreover, the tooth portions 12 on top of the main body 11 are complementary with the tooth portions 13 on bottom of the main body 11, i.e., the tooth portions 12 on top of the main body 11 are staggered with the tooth portions 13 on bottom of the main body 11.

To form the silicon-steel structure of the present invention, the tooth portions 12 and 13 are bent vertically with respect to the main body 11. Afterward, the main body 11 is rolled to form a cylindrical shape as shown in FIG. 4.

Figure 5:
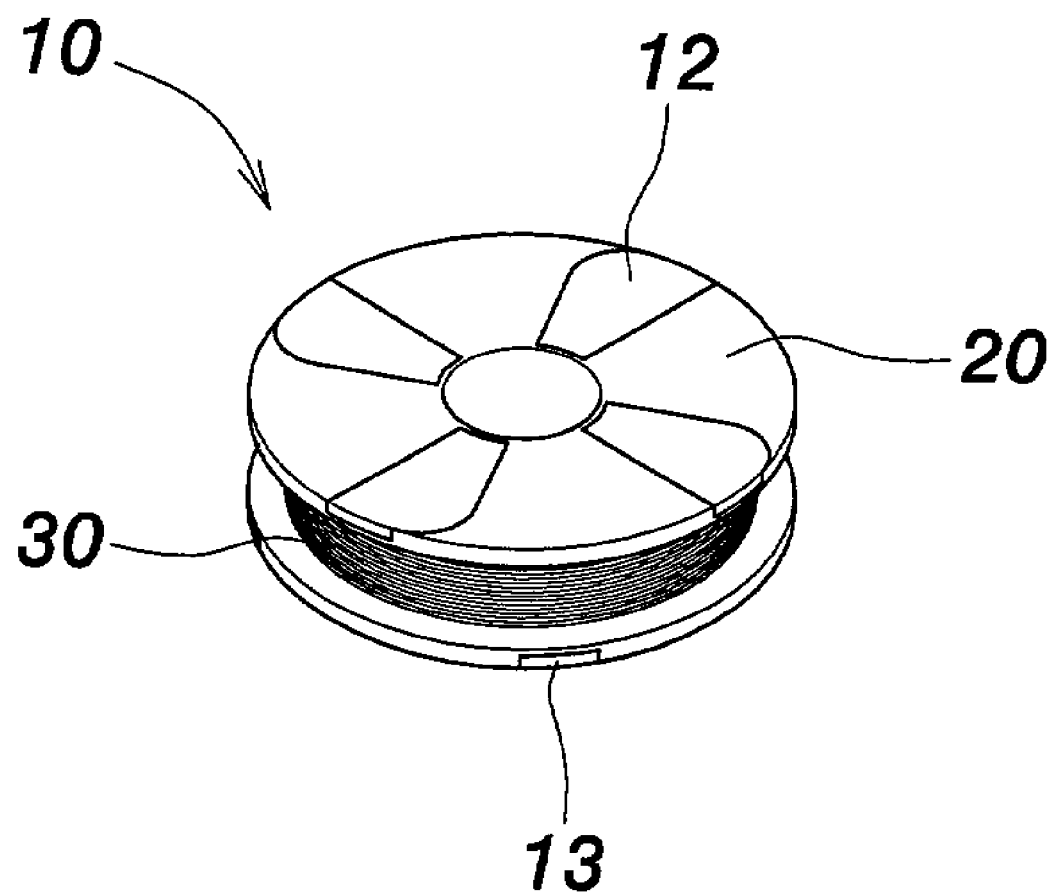
FIG. 5 shows the motor stator formed by the silicon-steel structure of the present invention.

With reference to FIG. 5, an insulating layer 20 is covered on outer surface of the silicon-steel plate 10 and a winding 30 with predetermined turns is wound around the insulating layer 20, thus forming a DC brushless stator. The thus formed DC brushless stator can be used to fabricate a high-efficiency motor.

Figure 6:
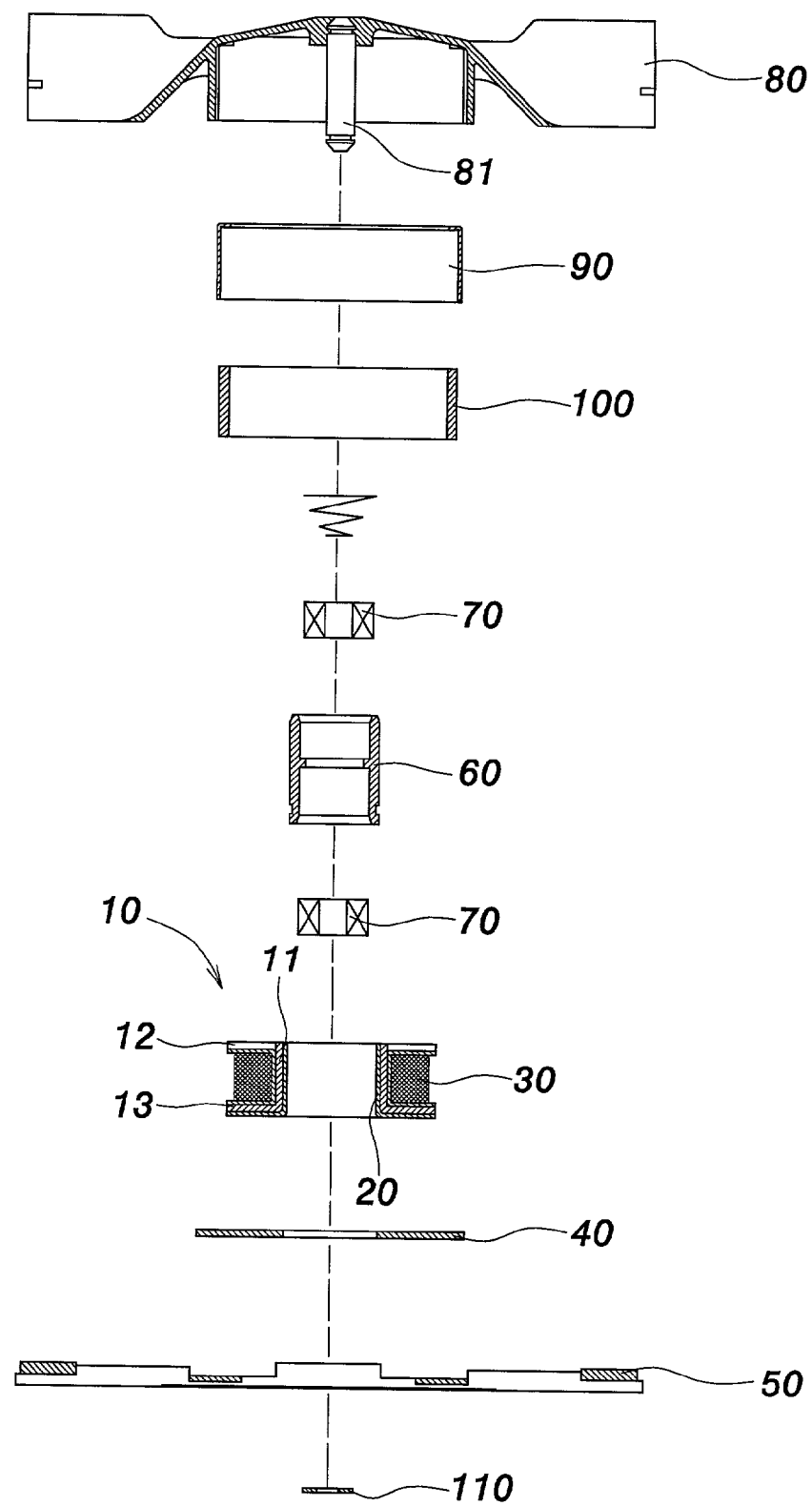
FIG. 6 shows the exploded view of a motor r formed by the silicon-steel structure of the present invention.

FIG. 6 shows an exploded view of a motor using the DC brushless stator made by the silicon-steel plate 10 of the present invention. The silicon-steel plate 10 is placed atop a printed circuit board (PCB) 40 and a bottom plate 50. A copper sheath 60 with two bearings 70 is arranged within the stator. As shown in this figure, a blade 80 is arranged atop the DC brushless stator; and a shell 90 and a magnet 100 are arranged on inner wall of the blade 80, wherein the magnet 100 is functioned as outer rotator. The inner circle of the outer rotator has a separation with the outer circle of the inner rotator to form an air gap therebetween. The axis 81 of the blade 80 passes through the bearings 70 of the copper sheath 60, the printed circuit board 40 and the bottom plate 50. A C-shaped ring 110 is used to retain the blade 80 on the bottom plate 50.

The DC brushless stator formed by the silicon-steel structure of the present invention has the advantages of compact size, high winding occupancy and simple winding process. The structure is simplified and the cost is reduced.

The whole silicon-steel plate 10 (including the main body 11 and the tooth portions 12 and 13) is integrally formed. The silicon-steel plate 10 has not conventional problem wherein the iron sleeve is hard to assemble between the two silicon-steel plates, and the parallel between the silicon-steel plates is hard to maintain. Therefore, the motor made by the silicon-steel structure of the present invention has high output power. Moreover, the silicon-steel structure of the present invention is integrally formed to overcome the problem of air gap between prior art iron ring and silicon steel plate. The DC brushless stator formed by the silicon-steel structure of the present invention has closed magnetic circuit to provide satisfactory motor speed.

Figure 7:
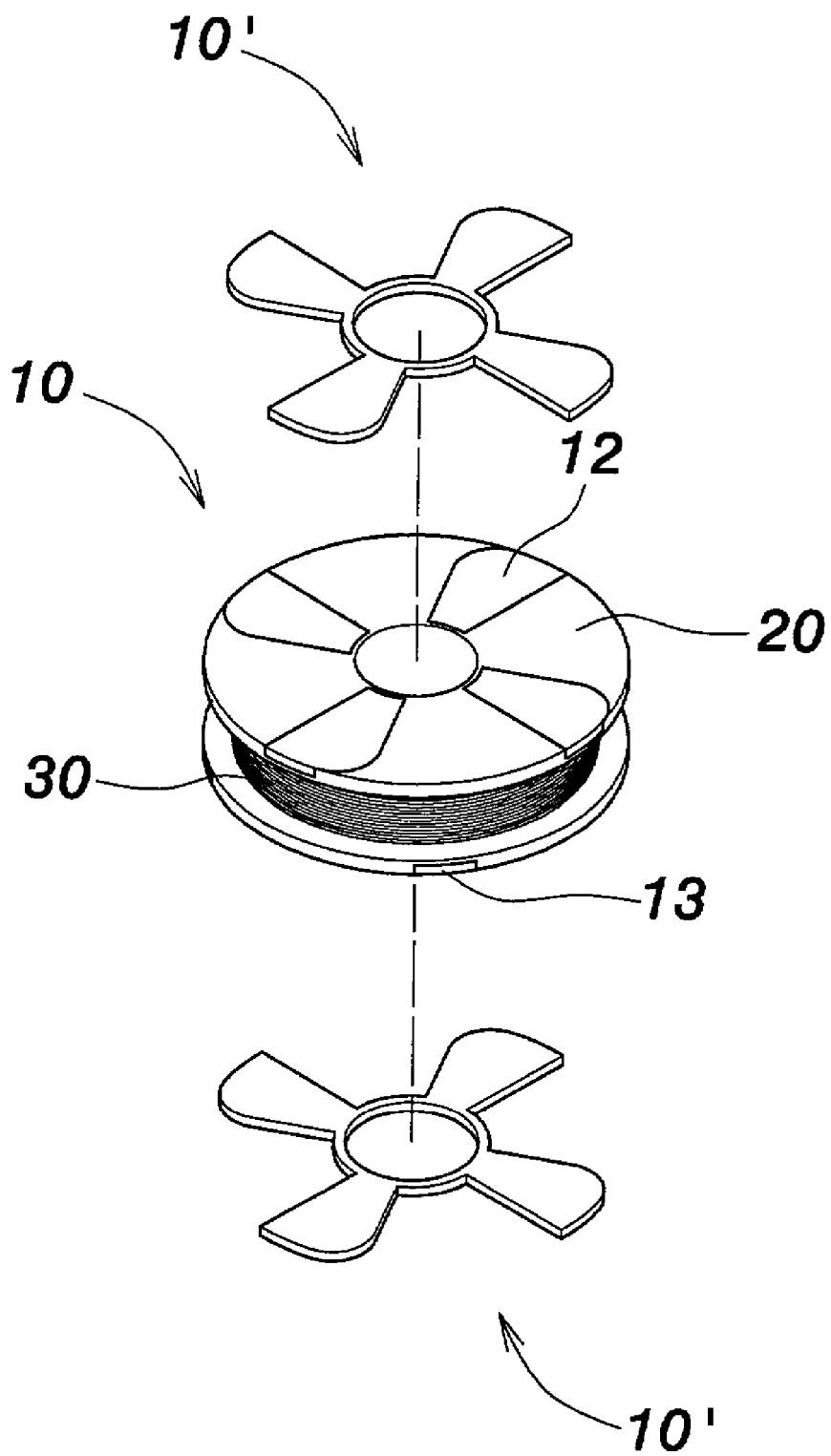
FIG. 7 shows the perspective view of another preferred embodiment of the present invention.

With reference now to FIG. 7, a plurality of silicon-steel plates 10' are stacked on top and bottom surface of the silicon-steel plate 10 of the present invention for the application of large motor.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

The invention claimed is:

1. A stator structure for a motor produced according to the process comprising the steps of:
   a. forming a main body portion having a rectangular contour with a plurality of tooth portions formed on two opposing longitudinally extended sides thereof from a single silicon-steel plate, said plurality of tooth portions being arranged in staggered relationship;
   b. bending said plurality of tooth portions to extend orthogonally from one surface of said main body;
   c. rolling said main body into a tubular cylindrical shape with said plurality of tooth portions extending radially therefrom;
   d. covering at least one surface of said main body and at least one surface of at least a portion of said plurality of tooth portions with an insulating layer; and,
   e. winding a predetermined number of turns of an electrically conductive wire around said main body.

* * * * *